United States Patent [19]

Welsh

[11] 4,143,987
[45] Mar. 13, 1979

[54] CONNECTOR FOR SECTIONS OF OIL CONTAINMENT BOOM

[75] Inventor: Howard Welsh, Bothell, Wash.

[73] Assignee: Bennett Pollution Controls, Ltd., North Vancouver, Canada

[21] Appl. No.: 883,701

[22] Filed: Mar. 6, 1978

[51] Int. Cl.² .................... B25G 3/00; F16D 1/00
[52] U.S. Cl. .................... 403/348; 403/11; 403/331; 403/407; 220/4 E; 285/67; 405/66; 405/70
[58] Field of Search ........... 403/11, 331, 335, 348, 403/353, 407; 220/4 E; 285/67, 73, 74, 76, 79, 325, 376, 38, 401; 61/1 F; 49/41

[56] References Cited

U.S. PATENT DOCUMENTS

| 2,720,765 | 10/1955 | Drexler | 403/335 X |
| 2,732,751 | 1/1956 | Heidecke et al. | 285/401 X |
| 3,387,403 | 6/1968 | Crouch | 220/4 E X |
| 3,892,431 | 7/1975 | Booth | 285/79 |

FOREIGN PATENT DOCUMENTS 238795 8/1925 United Kingdom ............ 285/74

Primary Examiner—Wayne L. Shedd

[57] ABSTRACT

A connecting assembly comprising a pair of substantially identical connecting members having a base ring connected to an upper tubular inflatable portion of an oil containment boom, and a depending arm adapted to engage a depending skirt of an oil containment boom. Each base ring comprises first and second interlocking members in the form of grooves and flanges adapted to interfit with one another in order to attach two segments of oil containment booms together. When offset angularly and placed face to face, with the groove of the final connecting member aligned with the flange of the second connecting member, and the flange of the first connecting member aligned with the groove of the second connecting member, two connecting members may be rotated toward one another and locked together. External fastening devices located on the arm depending from the base ring prevent counter-rotation which would disassemble the connecting members.

12 Claims, 15 Drawing Figures

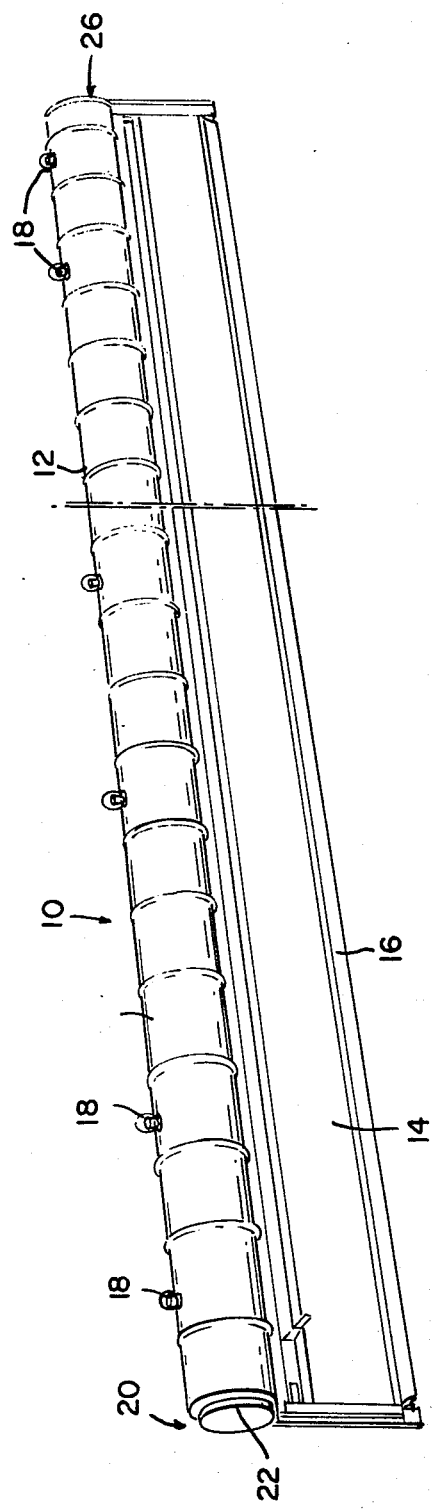
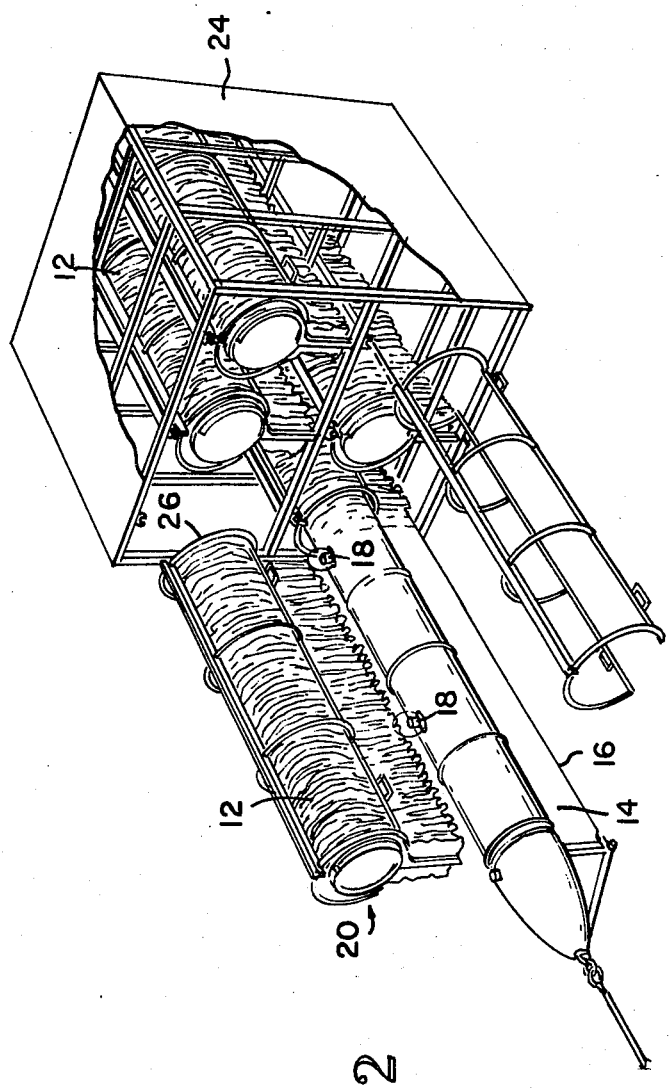

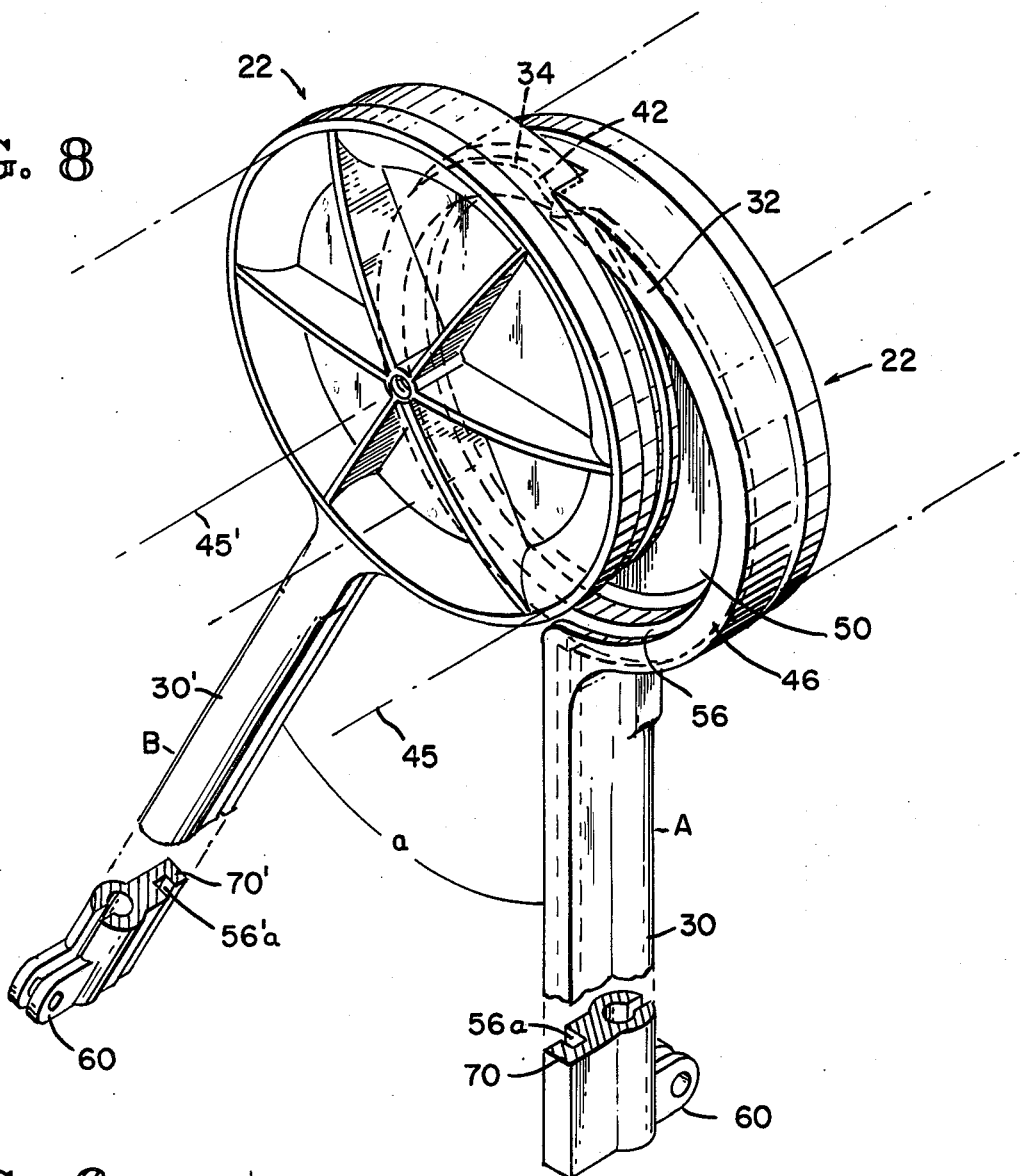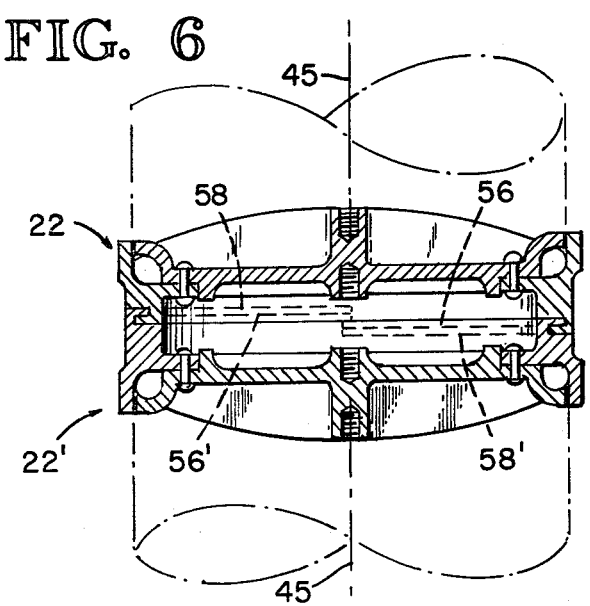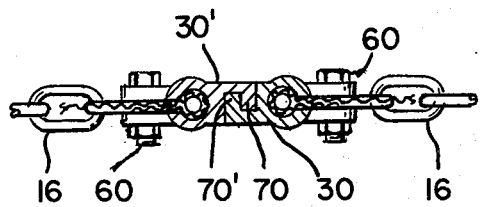

FIG. 9
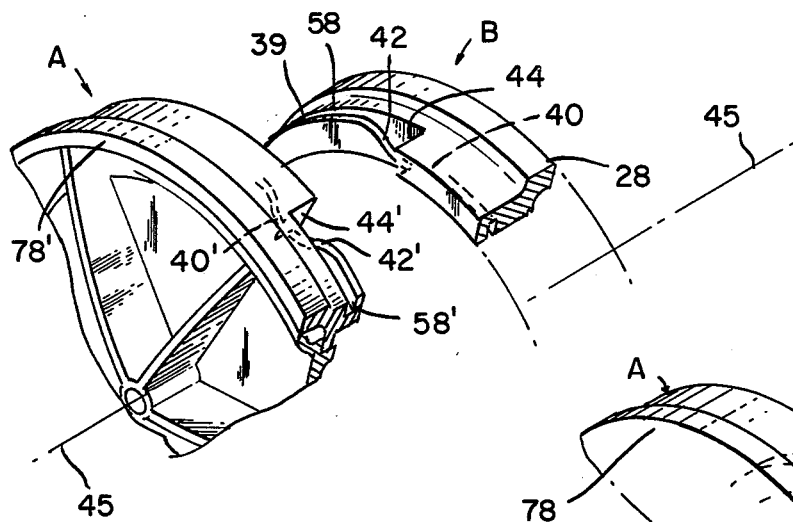
FIG. 10
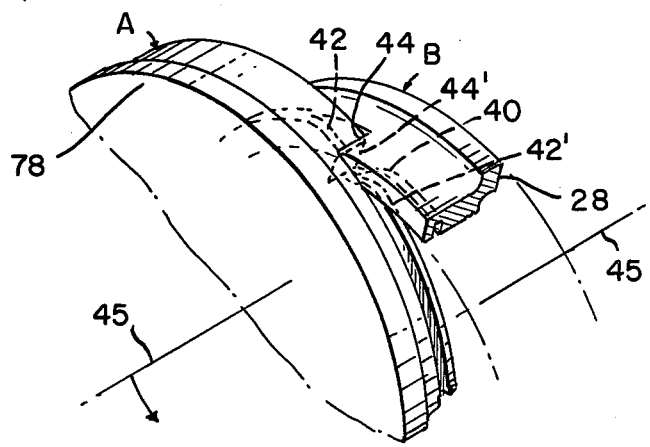
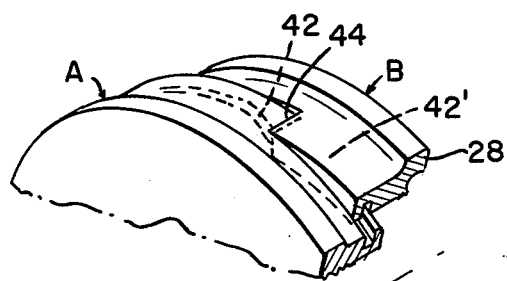
FIG. 11
FIG. 12
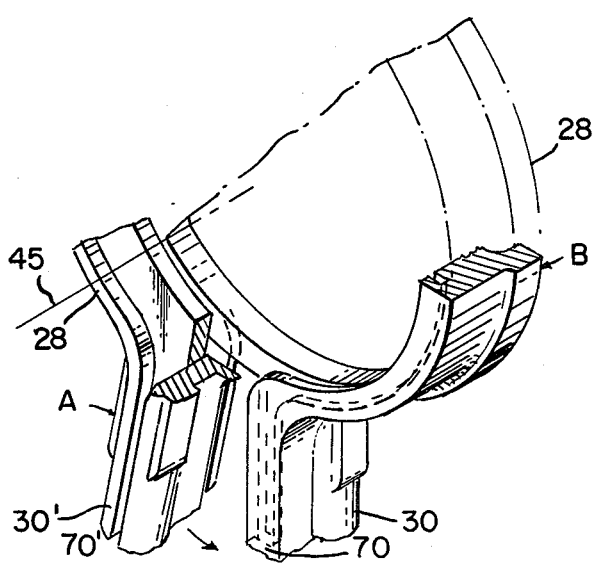

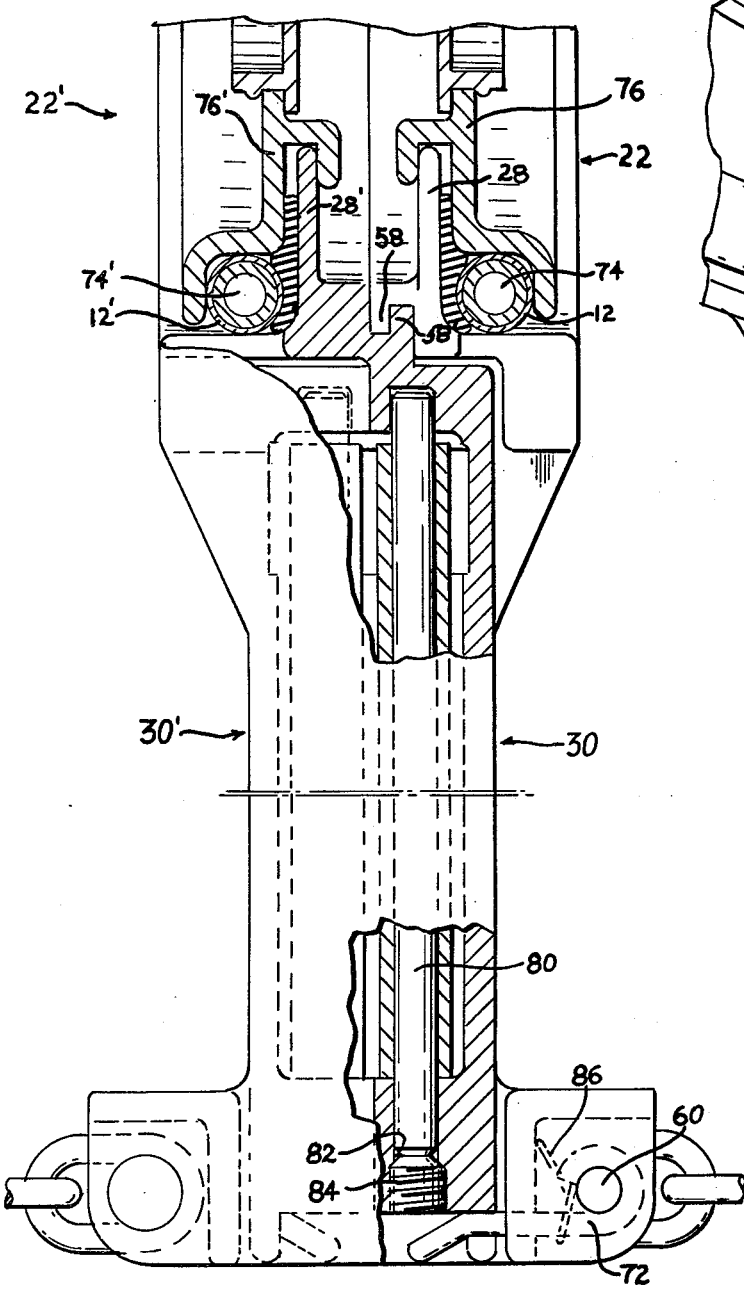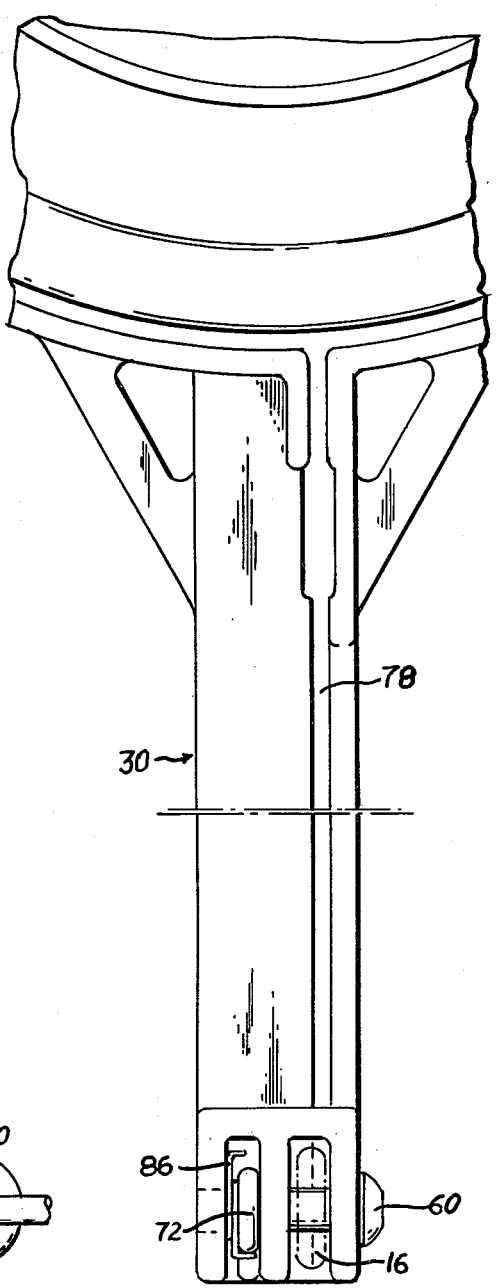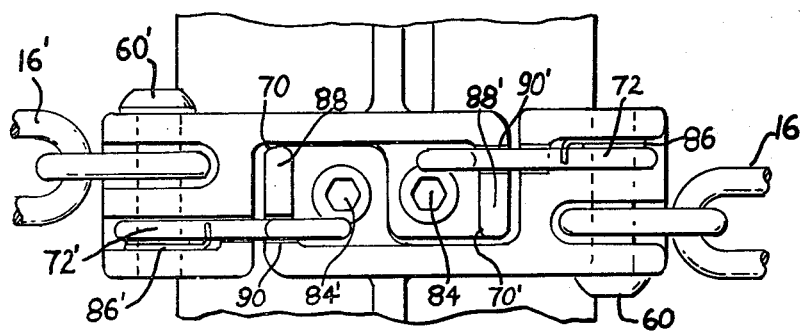
FIG. 13 FIG. 14
FIG. 15

CONNECTOR FOR SECTIONS OF OIL CONTAINMENT BOOM

BACKGROUND OF THE INVENTION

1. Field of the Invention

The present invention relates to connecting devices such as those comprising mating pairs of substantially identical members for connecting segments of oil containment boom one to another.

2. Description of the Prior Art

One of the problem areas in the effective deployment of floating tubular oil containment booms is the manner in which boom segments are to be attached to one another in order to make a sufficiently long boom to contain large oil spills.

In a large oil spill, it may be necessary to deploy a single boom having a length of many thousands of feet. Since it is not practical to make a single boom of that length, it is common to provide a plurality of boom segments which are joined one to another at the location of the oil spill. Because of the severe stresses placed upon any such connecting device due to the twisting and rolling of the inflated boom while floating in water, conventional connecting means such as simply connecting two members by a plurality of bolts is not practical, since the bolts might work loose. Also, the time involved in making the many bolt connections makes this type of connection impractical.

Thus a connecting assembly for such boom must not only have the strength and reliability to withstand the severe stresses caused by the twisting and rolling of boom segments due to wave action against the boom, it must also be simple and lightweight enough to be handled with a minimum of physical effort, and be capable of being attached with a minimum of time and effort to the corresponding mating connecting member on the adjacent boom segment. For ease of construction and operation it is desirable that the connecting assembly should consist of substantially identical mating connecting members, since this would enable either end of a boom segment to be attached to a connecting member of a second boom segment.

While a search of the prior art in the patent literature did not disclose any connecting devices for oil booms which appear especially relevant to the present invention, there were disclosed various coupling devices in other environments, these coupling devices utilizing halves to effect a coupling of two sections of tubular material. One type of prior art coupling device represented by U.S. Pat. No. 3,953,057, Petzetakis, comprises a pair of generally cylindrical coupling members with oerlapping semi-cylindrical shell portions, each having a circumferential groove with transversly (radially) interfitting formations resisting axial separation, and a connecting sleeve axially shiftable over the coupling members to prevent relative transverse movement sufficient to release the formation. In yet another configuration, U.S. Pat. No. 3,260,539, Herron, describes a coupling for the quick disconnecting of interconnected fluid conduits which utilizes a gasket completely sealing the coupling. The invention utilizes complementary halves which are coupled by a movement perpendicular to the axis of the coupling. Each coupling half is provided with a flange and a portion having a recess on opposite sides of a circular face, with each flange and recess being fitted with a radially aligned hole, which when coupled, receives a screw through the two halves to secure the coupling.

As another example of the prior art, U.S. Pat. No. 3,605,337, Rogers, illustrates a closure member arrangement applicable to high pressure hoses and pipes as well as access openings in pressure vessels. The coupling apparatus comprises a collar adapted to be secured around an opening, a sealing surface, and a collar clamp with a groove which extends over a laterally protruding lip to effect a seal. Other embodiments show two mated halves pivotally mounted on a circumferential pivot point so that the opposing circumferential tongue and grooves are matched together.

U.S. Pat. No. 2,439,254, Levin, discloses yet another coupling mechanism wherein duct ends are formed with end semi-circumferential flanges and lips having bolt openings, so that when two complementary end faces are abutted one to another the flanges overlap the lips and the bolt holes align so that the two halves may be bolted together. A gasket is provided between the end faces to make the joint airtight. The invention is especially adapted for use in ventilating air ducts of ships since it will remain attached even though the vibration caused by wave action causes one or more bolts to become detached.

U.S. Pat. No. 348,556, Grueninger, discloses a method of affixing complementary sections of pipe whereby radially protruding circumferential collars are fitted with a semi-circumferential axial sleeve. When the identical sections of pipe abut one another, each radial collar slips under the opposing semi-circumferential axial sleeve, and the two sections are secured by bolts at diametrically opposed locations through the lip and sleeve on the radial faces.

It is an object of the present invention to provide a locking device which will effectively attach oil containment boom segments and remain locked in spite of being subjected to the various environmental elements. It is a further object to provide a locking device which is composed of substantially identical coupling members so that only a single member need be made for each end of the boom segments and also to provide coupling members which are easily connected to one another.

SUMMARY OF THE INVENTION

In the present invention, there is a connecting assembly comprising a pair of first and second connecting members, such as those used for connecting two sections of an oil containment boom. Each of said connecting members comprises a base ring having a longitudinal axis generally perpendicular to a plane defined by the ring, said ring having a forward side and a back side and also having a connecting pivot location at a first circumferential location on said ring and a second swing location at an opposite circumferential location on said ring.

Each ring has a first interlocking member connected to the forward side of the ring and extending from the pivot location in a semi-circular configuration to the swing location of the ring. The first interlocking member has a radially inwardly facing groove extending along the length of the first interlocking member.

Each ring also has a second interlocking member connected to the forward side of the ring and extending from the connecting pivot location in a direction opposite to the first interlocking member in a semi-circular configuration to the swing location on the ring. The second interlocking member has a radially outwardly facing flange extending along the length of the interlocking member. The first and second interlocking members are aligned in parallel planes but offset from one another with respect to their axial position on the base ring.

The first interlocking member of the first connecting member is arranged to receive in its groove in interlocking relationship a mating flange from the second connecting member. Also, the flange of the second interlocking member of the first connecting member is adapted to fit in interlocking relationship into a groove formed in the second connecting member.

The first interlocking member of each connecting member is formed with a radially inwardly extending first locking abutment face at the connecting pivot location at the location of the groove. The second interlocking member of each connecting member has its flange formed at the connecting pivot location with a radially inwardly extending second locking abutment face.

The first locking abutment face of each connecting member is arranged to engage the second locking abutment face of the other connecting member to restrict relative lateral movement between the first and second connecting members at the location of the connecting pivot location. The second locking abutment face of each connecting member defines with a pivot end portion of its related first interlocking member at such connecting pivot location an access area into which a pivot end of the other connecting member may be moved axially when the first and second connecting members are offset angularly with respect to one another.

The first and second connecting members can be fixedly interconnected one to another by first placing forward faces of the members opposite one another and angularly offset from one another, and then moving the connecting members toward one another so that each pivot end of each first interlocking member enters into the access area of the other connecting member. In this position, the related flanges and grooves of the two connecting members come into alignment with one another. Then each connecting member can be moved angularly with respect to one another about the connecting pivot location toward one another so that said flanges come into engagement in the related grooves of the other connecting member.

In the preferred configuration, each of said connecting members comprises an arm depending from the second swing location of its related base ring. Each arm has a lengthwise axis in generally the same plane as the plane of its base ring, and each arm is provided with tongue and groove means to interlock with the arm of the other connecting member. There are securing means on a connecting pair of arms, which securing means interlock with one another and thus co-act with the interengaging abutment faces of the connecting members to hold the connecting members securely together.

In the preferred application where the connecting members are connected to ends of oil containment booms, the back side of each base ring is connected to an inflated tubular portion of the oil containment boom. The depending arm is connected to a skirt of the oil containment boom, which skirt depends from the inflatable tubular portion of the boom.

Other features of the present invention will become apparent from the following detailed description.

BRIEF DESCRIPTION OF THE DRAWINGS

FIG. 1 is an environmental view of an oil containment boom incorporating the present invention, the boom being in its deployed position;

FIG. 2 is an environmental view of the oil containment boom of FIG. 1 in its stored position;

FIG. 6 is a sectional view of two members, such as shown in FIG. 2, interlocked with one another;

FIG. 7 is a sectional view of the two depending arms of two connecting members joined one to another;

FIG. 8 is an isometric view illustrating the initial coupling position of the two connecting members of the present invention;

FIGS. 9 through 12 are isometric views illustrating in sequence the coupling of the two connecting members of the present invention.

FIG. 13 is a side elevational view of the bottom portion of a pair of connecting members, with portions thereof broken away;

FIG. 14 is a elevational view of the connecting members of FIG. 13 taken from a position 90° offset from the view of FIG 13;

FIG. 15 is a bottom view of the connectors of FIG. 13 and 14.

DESCRIPTION OF THE PREFERRED EMBODIMENT

Figure 3:
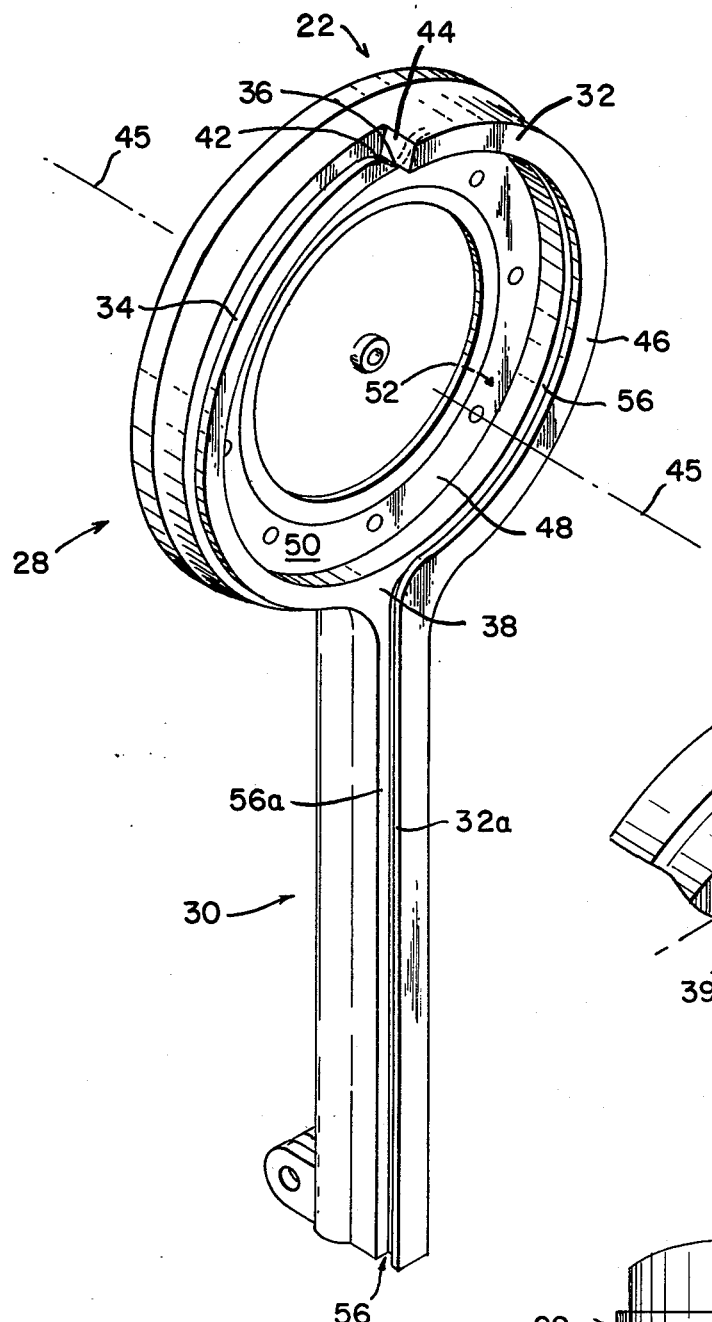
FIG. 3 is an isometric view of one of the connecting members of the present invention by which sections of the oil boom of FIGS. 1 and 2 can be joined to one another.

As shown in FIG. 1, there is a single segment of an oil containment boom 10 as it would appear positioned floating in a body of water, this boom 10 comprising an upper tubular inflated portion 12, a depending planar skirt 14 weighted at the bottom as at 16, and check valves 18 for inflation and deflation of the upper tubular portion 12. At the end portion 20 of each boom segment 10 there is a connecting member 22, which will be described in greater detail hereinafter. Upon deflation and removal from the water, the boom segments 10 may be either stored in racks 24 as shown in FIG. 2, or stowed on the deck of the retreival ship.

The boom segments are commonly joined to one another by means of the connecting members 22 as the boom is being deployed in a body of water around an oil spill. As each self-inflating boom segment 10 is placed into the water, the trailing end portions 26 of that deployed boom segment 10 is affixed to the leading end portion 20 of the next segment by the use of the connecting members 22.

As illustrated in FIG. 3, the connecting member 22 consists essentially of a base ring 28 and a depending arm 30. The primary features of the base ring 28 which are signficant in the present invention and which will be described in more detail hereinafter, are first 32 and second 34 semi-circular interlocking members, which meet at an upper connecting pivot location 36 and at a lower swing location 38, first and second locking abutment faces 40 and 42, respectively, and a pivot abutment face 44, these abutment faces 40 through 44 being located at the pivot location 36. The connecting pivot location 36 and swing location 38 are at diametrically opposed points on the periphery of the base ring 28.

The connecting member 22 may be made of any suitable lightweight rigid material, such as aluminum, which can be cast to the appropriate configuration. The material used must have the strength to withstand the considerable forces exerted on the connecting member due to the rolling and twisting of the upper inflated tubular member to which it is attached, and should be able to withstand the corrosive action of sea water.

To describe generally the base ring 28, it consists of an outer circumferential portion 46 and an inner structural support portion 48. This outer portion 46 has a front side 50 and a back side 52, with the interlocking members 32 and 34 mounted on the front side 50 of said base ring 28. The back side 52 of said base ring 28 is adpated to be mounted to the end portion 20 of an inflated boom segment 10, with the front side 50 being arranged to interconnect with the front side 50 of a mating connecting member 22.

While the connecting members 22 of the present invention are especially adapted to be easily connected and disconnected from one another in order to attach or detach boom segments 10 to one another, it can be readily appreciated that for ease of retreival, deployment and storage some of the connecting members 22 may be left attached to one another during storage. If it is desired to use a smaller quantity of oil containment boom 10 upon subsequent use, a longer portion can simply be broken apart by separating the connecting members 22 from one another.

One of the problems with many prior art connecting devices is that they require a number of securing devices, such as pins or bolts, to be applied after the mating of the two connecting members is made so that the mated halves do not separate laterally. This involves not only the extra time and labor to effect the completed coupling but also the chance that the bolts or pins will work loose or break, and the connection fail. Thus it is important that the devices used to couple adjacent boom segments 10 have as few external fastening devices as possible. The present invention utilizes only one external fastening devices, described later herein, in conjunction with a coupling arrangement designed to effectively withstand the various forces experienced in a marine environment.

Protruding axially from the front side 50 of the base ring 28 in a semi-circular configuration in the form of a shelf, is the aforementioned first interlocking member 32. This first interlocking member 32 has a radially inwardly opening semi-circular groove 56, generally rectangular in cross-section, formed within the radially inward surface of the first interlocking member 32. This first interlocking member 32 originates at the connecting pivot location 36 and continues at least to the swing location 38 in a 180° arc.

Also originating at the pivot location 36 is the second semi-circular interlocking member 34 which has a radially outwardly facing flange 58 which follows a semi-circular path opposite that of the first interlocking member 32 around the periphery of the base ring 28. This flange 58 is also generally rectangular in cross-section. Since in the interconnected position, the flange of the second interlocking member 34 fits within the groove 56 of the first interlocking member 32 of a second identical connecting member 22, the flange 58 has substantially the same cross-sectional configuration as the groove 56, but with only slightly smaller dimensions to provide for a secure fit.

In the following description, to indicate the manner in which two connecting members 22 are connected to one another the second connecting member and its components will be given the same numerical designations as the first connecting member, with a prime (') designation distinguishing those of the second member.

The first interlocking member 32 terminates abruptly at the connecting pivot location 36 to form the aforementioned pivot abutment face 44. The pivot abutment face 44 is aligned in a plane parallel to and passing through the longitudinal center axis 45 of the base ring 28 and perpendicular to the plane of the base ring 28. The radially outer edge of the pivot abutment face 44 may be generally described as the connecting pivot location 36, since this is the location about which the two connecting members 22 and 22' are rotated with respect to one another.

Figure 4:
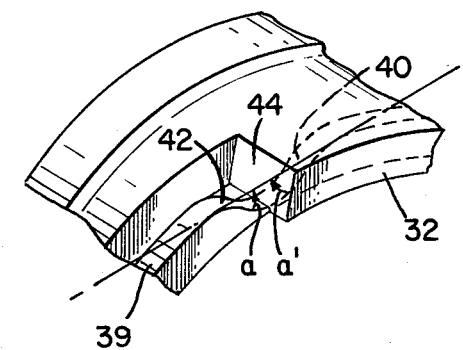
FIG. 4 is a partial isometric view looking down at the connecting member of FIG. 3.

The first and second locking abutment faces 40 and 42, formed by radially inward deflections of, respectively, the groove 56 and flange 58, are each slanted at an angle, indicated at "a" and "a'" in FIG. 4, of approximately 30°–45°. Each angle "a" and "a'" is defined by a line tangent to the circumference of the ring 28 at the point of deflection of, respectively, the semi-circular groove 56 or flange 58, and a line drawn parallel to the midpoint of the radially inwardly curved portion of the locking abutment faces 40 and 42. The two locking abutment faces 40 and 42 have the same angle of radially inward deflection, and the angular configuration thereof are mirror images of each other with the pivot abutment face 44 being the axis of symmetry. The most radially inward portion of each locking abutment face 40 and 42 terminates at the radially inward edge of the pivot abutment face 44.

Figure 5:
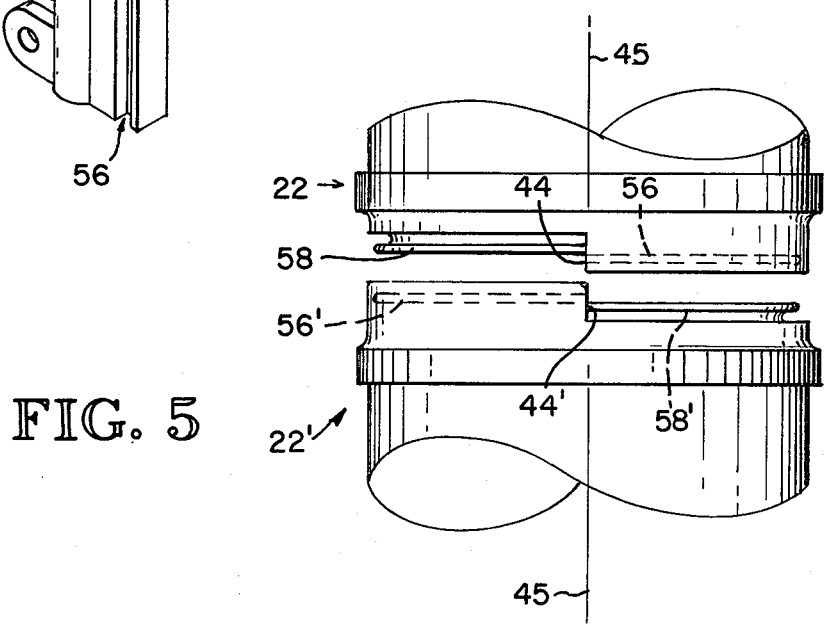
FIG. 5 is a top view of two connecting members of FIG. 3 spaced from one another.

For two connecting members 22 and 22' to interengage properly, the locking abutment faces 40 and 42 should have the same angle of deflection from their semi-circular pattern and must be offset from one another with respect to their axial position on the face 50 of the base ring 28. As seen in FIG. 5, the two connecting members 22 and 22' are aligned on the same longitudinal axis 45, and placed face to face for the purpose of comparing the relative locations of the grooves 56, 56' and flanges 58, 58' without the angular offset necessary for coupling the members 22 and 22' as described later herein. The plane of the groove 56 perpendicular to the longitudinal axis 45 is offset along the longitudinal axis 45 with respect to the plane of the flange 58, so that when identical members 22 and 22' are placed in adjacent contact and face to face, the flange 58 of member 22 will fit within the groove 56' of member 22' and the groove 56 of member 22 will fit over the flange 58' of member 22'.

The arm 30 depends from the outer circumferential edge 46 of the base ring 28 at the swing location 38. The first interlocking member 32 continues as a downward extension 32a from the swing location 38 down the arm 30 with an elongate groove 56a facing laterally from the front of the arm 30. At the lower end of the arm 30 there are securing means 60, FIG. 7, to attach a weight 16 generally in the form of a chain extending the length of the planar skirt 14, at the bottom of the skirt 14. In the preferred form, there are external attachment devices located on the lower end of the depending arm 30, which are spring loaded so that no threading of bolts or screws is necessary. For ease of illustration and to aid in the understanding of the operation of the present invention, these attachment devices are shown only in FIGS.

13-15, but it is to be understood that they would be present on the connecting members illustrated in FIGS. 1-12.

In order to attach two of the connecting members 22 to one another to connect two sections of oil containment boom 10, the two substantially identical connecting members 22 and 22' are placed face to face and angularly offset from one another, so that pivot locations 36 and 36' are aligned and the swing locations 38 and 38' are laterally offset from one another at an angle equal to or greater than the aforementioned angle "a". The two connecting members 22 and 22' are then moved toward one another axially until the front side 50 of the base rings 28 and 28' generally, and the radially outermost edge of the pivot abutment faces 44 and 44' in particular, come into adjacent contact. After this initial axial movement (shown in FIGS. 9 and 10) is made, the next movement in order to couple the connecting members 22 and 22' is a lateral angular movement in which the members 22 and 22' are swung toward one another, as shown in FIGS. 11 and 12. As the members 22 and 22' are rotated about the connecting pivot location 36, the portions of the flanges 58 and 58' adjacent their locking abutment faces 42 and 42' enter into the portions of the grooves 56 and 56' adjacent their locking abutment faces 40 and 40'. With further rotation of the members 22 and 22', the entire semi-circumferential length of both flanges 58 and 58' come into locking engagement with related grooves 56' and 56, and the locking abutment faces 40 and 40' come into locking engagement with related locking abutment faces 42' and 42. Also, the two pivot abutment faces 44 and 44' come into engagement with one another.

It will be readily apparent that the aforementioned coupling process as shown in FIGS. 9 through 12 would not be possible without the particular arrangement of the locking abutment faces 40, 40', 42 and 42'. In order to obtain an initial engagement of the interlocking members 32, 32', 34 and 34', with the connecting members 22 and 22' offset laterally from one another, there must be an "access" area, provided by the slanting of the abutment faces 42 and 42'. This "access" area provides an open space wherein the connecting members 22 and 22' may be moved into adjacent contact with one another without being impeded by the protruding flanges 58 and 58' at the pivot location.

The final locking sequence, as shown in FIGS. 8 and 12, involves the mating of the two depending arms 30 and 30'. The first interlocking member 32 or 32' is offset with respect to its related interlocking member 34 or 34'. Thus when the two connecting members 22 and 22' are placed into engagement with one another, the plane of the groove 56 will be offset axially from the groove 56' of the mating connecting member, so that the axially outermost lip portion 70 defining the groove 56a of the arm 30 fits into the corresponding groove 56'a' of the arm 30' along the length of the arms 30 and 30'. Simultaneously, the lip portion 70' defining the groove 56a' of the arm 30' fits into the groove 56 of the arm 30. This results in what might be considered as a unitary arm, as shown in FIG. 7, in which the two arms 30 and 30' are rigidly interconnected. When the lower most portions of arms 30 and 30' come into adjacent contact, the external fastening devices (as mentioned previously, these are illustrated only in FIGS. 13-15) located on the end portion of each arm 30 automatically interlock the two members without the use of bolts or pins.

FIG. 13-15 not only illustrate the automatic connecting device for the two arms 30, but also illustrate a second, alternative configuration of the arm 30, with the external fastening device 72 at the lower end thereof. This configuration differs from that of FIGS. 1-12 primarily in the manner of attaching the skirt 14 to the arm 30, and the configuration of the grooves 56 and flanges 58 on the arm 30. Components of this second configuration similar to those of the first configuration will be identified by the same numerical designation.

The method of attaching the upper tubular inflated portion 12 to the connecting members 22 may be more easily seen in FIG. 13. The end of the tubular portion 12 is stiffened by a circular loop 74, and the end of the tubular boom portion 12 is held against the back side of the base ring 28 by a circular plate 76 which is threadably connected to the back of the base ring 28.

The skirt 14 is attached to the arm 30 by sliding the end of the skirt 14 into a vertical slit 78 provided along the length of the arm 30, then inserting an elongate pin 80 into a hole 82 provided in the arm 30, and then moving the pin 80 up through a sleeve provided at the end of the hole 82 to prevent the pin 80 from falling out and thereby releasing the skirt 14.

At the lower end of the arm 30 the chain 16 is attached to the arm 30 by means of a bolt 60. This bolt also affixes the external fastening devices 72 to the arm 30. This fastening device 72 is tensioned with the use of a simple spring 86 which forces the fastening device 72 upwardly in contact with the opposing arm 30. The final step in affixing the two connecting members 22 and 22' to one another (after the movements illustrated in FIGS. 9-12) is bringing the ends of the arms 30 and 30' together, thereby causing a locking engagement. The fastener 72 of one member 22 contacts a slanted cam face 88' of the outermost lip portion 70' of the mating member 22', and as the ends of the arms 30 are brought into parallel alignment, the fastener 72 slides downwardly along the cam face 88 and then springs upwardly into a groove 90 provided in the lip portion 70. Simultaneously, the fastener 72' of member 22' is engaged within the groove 90', thereby causing the members 22 and 22' to become releasably fastened to one another without the use of bolts or screws.

What is claimed is:

1. A connecting assembly, comprising a pair of first and second connecting members, such as connecting members for two sections of an oil containment boom, each of said connecting members comprising:
   a. a base ring having a longitudinal axis generally perpendicular to a plane defined by said ring, said ring having a forward side and a back side, said ring having a connecting pivot location at a first circumferential location on said ring and a second swing location at an opposite circumferential location on said ring,
   b. a first interlocking member connected to the forward side of said ring and extending from said connecting pivot location in a semi-circular configuration to said swing location on said ring, said first interlocking member having a radially inwardly facing groove extending along the length of said first interlocking member,
   c. a second interlocking member connected to the forward side of said ring and extending from said connecting pivot location in a direction opposite to the first interlocking member in a semi-circular configuration to said swing location on said ring, said second interlocking member having a radially outwardly facing flange extending along the length of said second interlocking member, d. said first and second interlocking members being aligned in parallel planes and offset from one another with respect to their axial position on said base ring, e. said first interlocking member of the first connecting member being arranged to receive in its groove in interlocking relationship a mating flange from said second interlocking member, and said flange of the second interlocking member of the first connecting member being adapted to fit in interlocking relationship into a groove formed in said second connecting member, f. said first interlocking member of each connecting member being formed with a radially inwardly extending abutment face at said connecting pivot location at the location of said groove, g. said second interlocking member of each connecting member having its flange being formed at the connecting pivot location with a radially inwardly extending second abutment face, h. said first abutment face of each connecting member being arranged to engage said second abutment face of the other connecting member to restrict relative lateral movement between said first and second connecting members at the location of said connecting pivot location, i. said second abutment face of each connecting member defining with a pivot end portion of its related first interlocking member at said connecting pivot location an access area into which a pivot end of the other connecting member may be moved axially when said first and second connecting members are offset angularly from one another, whereby said first and second connecting members can be fixedly interconnected one to another by first placing forward faces of said members opposite one another and angularly offset from one another, then moving said connecting members toward one another so that each pivot end of each first interlocking member enters into the access area of the other connecting member, so that the related flanges and grooves of the two connecting members come into alignment with one another, after which each connecting member can be moved angularly with respect to one another about said connecting pivot location toward one another so that said flanges come into interlocking relationship in the related grooves of the other connecting member.

2. The assembly as recited in claim 1, wherein each of said connecting members comprises an arm depending from the second swing location at its related base ring, said arm having a lengthwise axis in generally the same plane as the plane of the base ring, said arm being provided with tongue and groove means to interlock with the arm of the other connecting member.

3. The assembly as recited in claim 2, wherein there are securing means located on each of said connecting members, said securing means being located on said arm depending from said base ring, whereby said securing means interlock with one another and co-act with interengaging abutment faces of the connecting members to hold said connecting members securely together.

4. The assembly as recited in claim 3, wherein the back side of said connecting member is arranged to engage an end portion of an inflated tubular structure, such as a segment of an oil containment boom, thereby permitting two of said segments to be affixed adjacent one another.

5. The assembly as recited in claim 4, wherein a back side of said depending arm is arranged to engage an end portion of a depending skirt of an oil containment boom, thereby maintaining said depending skirt in a downward position relative to said oil containment boom.

6. The assembly as recited in claim 1, wherein there is securing means interconnecting said connecting members at a location spaced from said connecting pivot location, whereby said securing means co-acts with interengaging abutment faces of the connecting members to hold said connecting members securely together.

7. A connecting member adapted to be joined to a substantially identical second connecting member, said member comprising:

a. a base ring having a longitudinal axis generally perpendicular to a plane defined by said ring, said ring having a forward side and a back side, said ring having a connecting pivot location at a first circumferential location on said ring and a second swing location at an opposite circumferential location on said ring, b. a first interlocking member connected to the forward side of said ring and extending from said connecting pivot location in a semi-circular configuration to said swing location on said ring, said first interlocking member having a radially inwardly facing groove extending along the length of said first interlocking member, c. a second interlocking member connected to the forward side of said ring and extending from said connecting pivot location in a direction opposite to the first interlocking member in a semi-circular configuration to said swing location on said ring, said second interlocking member having a radially outwardly facing flange extending along the length of said second interlocking member, d. said first and second interlocking members being aligned in parallel planes and offset from one another with respect to their axial position on said base ring, e. said first interlocking member being arranged to receive in its groove in interlocking relationship a mating flange of a second interlocking member from said second substantially identical connecting member, and said flange of the first interlocking member of the first connecting member being adapted to fit in interlocking relationship into a groove of the second interlocking member of said second connecting member, f. said first interlocking member of said connecting member being formed with a radially inwardly extending abutment face at said connecting pivot location at the location of said groove, g. said second interlocking member of said connecting member having its flange being formed at the connecting pivot location with a radially inward extending second abutment face, h. said first abutment face of said connecting member being arranged to engage a second abutment face of said substantially identical connecting member to restrict relative lateral movement between substantially identical connecting members at the location of said connecting pivot location, and i. said second abutment face of said connecting member defining with a pivot end portion of its first interlocking member at said connecting pivot location an access area into which a pivot end of the other connecting member may be moved axially when said first and second connecting members are offset angularly from one another, whereby said substantially connecting members can be fixedly interconnected with said substantially identical second connecting member by first placing forward faces of said substantially identical members opposite one another and angularly offset from one another so that each pivot end of each first interlocking member enters into the access area of the other connecting member, so that the related flanges and grooves of the two connecting members come into alignment with one another, after which each connecting member can be moved angularly with respect to one another about said connecting pivot location toward one another so that said flanges come into interlocking relationship in the related grooves of the other connecting member.

8. The assembly as recited in claim 7, wherein said connecting member comprises an arm depending from the second swing location at its related base ring, said arm having a lengthwise axis in generally the same plane as the plane of the base ring, said arm being provided with tongue and groove means to interlock with the arm of a substantially identical connecting member.

9. The assembly as recited in claim 8, wherein there are securing means located on said connecting member, said securing means being located on said arm depending said base ring, whereby said securing means interlock with one another and co-act with inter-engaging abutment faces of the connecting members to hold said connecting members securely together.

10. The assembly as recited in claim 8, wherein a back side of said connecting member is arranged to engage an end portion of an inflated tubular structure, such as a segment of an oil containment boom, thereby permitting two of said segments to be affixed adjacent one another.

11. The assembly as recited in claim 10, wherein the back side of said depending arm is arranged to engage an end portion of a depending skirt of an oil containment boom, thereby maintaining said depending skirt in a downward position relative to said oil containment boom.

12. The assembly as recited in claim 7, wherein there is securing means interconnecting said connecting member with said second connecting member at a location spaced from said connecting pivot location, whereby said securing means co-acts with inter-engaging abutment faces of the connecting members to hold said connecting members securely together.

* * * * *